United States Patent

Condas et al.

[15] 3,676,677
[45] July 11, 1972

[54] VARIABLE SENSITIVITY VISUAL DISPLAYER FOR INFRARED LASER BEAMS

[72] Inventors: George A. Condas, Hayward; Don W. Brown, Livermore, both of Calif.

[73] Assignee: The United States of America as represented by the United States Atomic Energy Commission

[22] Filed: Aug. 11, 1970

[21] Appl. No.: 63,198

[52] U.S. Cl. ................. 250/83.3 H, 250/71 R, 250/83.3 HP
[51] Int. Cl. .............................................. G01t 5/00
[58] Field of Search .............. 250/83.3 H, 83.3 HP, 71 R

[56] References Cited

UNITED STATES PATENTS

| | | |
|---|---|---|
| 3,015,731 | 1/1962 | Van Santen et al. .......... 250/83.3 HP X |
| 3,365,576 | 1/1968 | Teeg .............................. 250/83.3 HP |
| 3,598,998 | 8/1971 | Becker et al. ................... 250/83.3 HP |
| 3,365,577 | 1/1968 | Teeg et al. ....................... 250/83.3 HP |
| 3,493,754 | 2/1970 | Black .............................. 250/83.3 HP |
| 3,327,120 | 6/1967 | Weiss .............................. 250/83.3 HP |

Primary Examiner—Archie R. Borchelt
Attorney—Roland A. Anderson

[57] ABSTRACT

A thermographic phosphor screen caused to fluoresce by continuous ultraviolet excitation is impinged by an infrared laser beam which locally heats the phosphor to quench its fluorescence and thereby form an image of the beam as a dark pattern on the screen. Provision is made to vary the thermal bias on the screen over a range of phosphor temperatures commensurate with maximum optical resolution and sensitivity thru a wide range of impinging laser beam powers.

9 Claims, 1 Drawing Figure

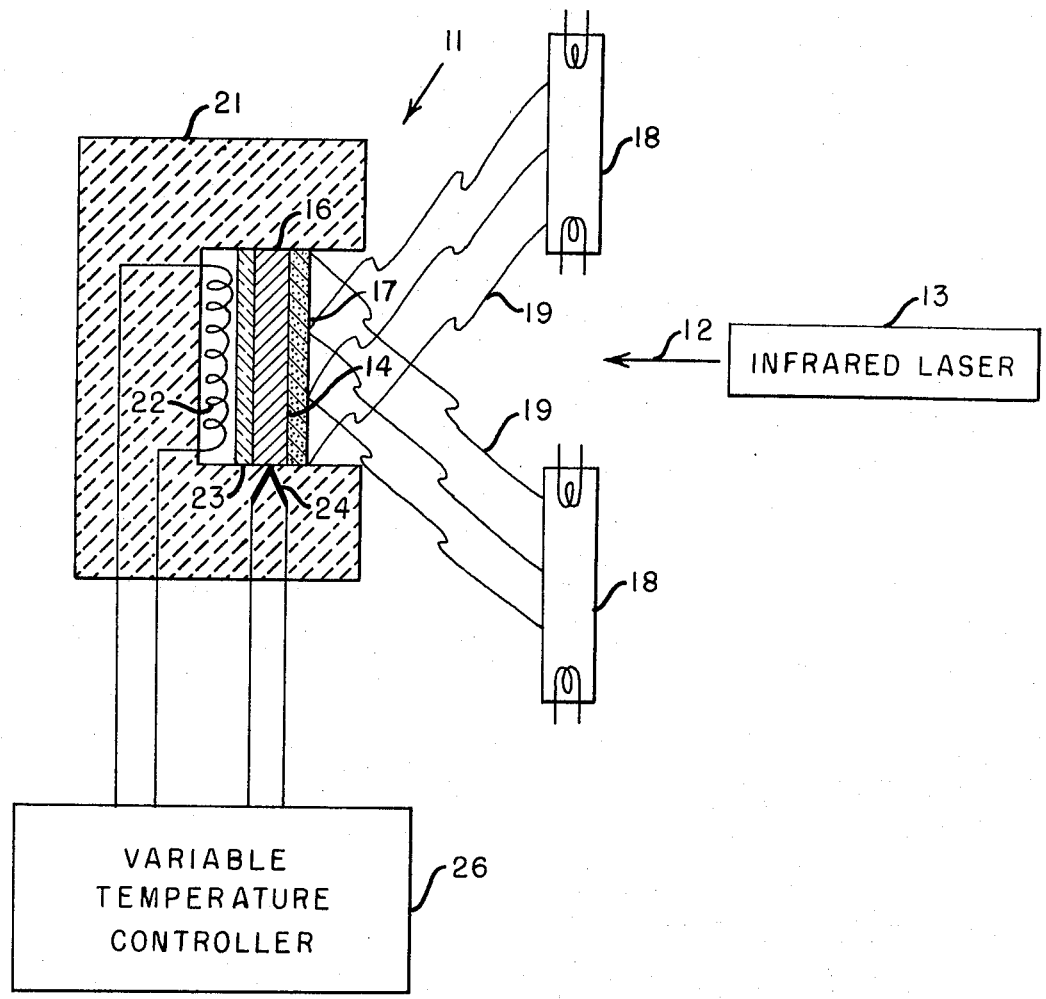

VARIABLE SENSITIVITY VISUAL DISPLAYER FOR INFRARED LASER BEAMS

BACKGROUND OF THE INVENTION

Thermographic phosphor viewing screens have been of great value in the alignment and adjustment of infrared laser beams since they allow continuous viewing of the position and mode characteristic of the otherwise invisible beam. Generally such screens include a substrate of a material such as a metal, dielectric, or the like which has proper thermal conductance properties. A surface of the substrate is coated with an internally quenched thermographic phosphor, such as Zn Cd S phosphor. The phosphor is flooded with longwave ultraviolet light to produce fluorescence. An infrared laser beam of interest directed upon the screen causes mode patterns to appear as darkened areas on a fluorescent background where the beam strikes. This darkening is due to a localized heating of the phosphor by the incident beam productive of thermal quenching of the fluorescence. In this regard the particular phosphor has a given quenching temperature at which darkening of fluorescence occurs. Consequently, when the laser beam power density is sufficient to locally heat the phosphor above such temperature, fluorescence is quenched in the area of beam incidence and a darkened pattern appears.

Conventional fluorescent display screens have been limited in that they cannot be used over a wide range of incident laser power. If a screen phosphor is selected to have a high quenching temperature, a low power laser beam does not supply sufficient heat to the phosphor to raise its temperature to the quenching temperature and darkening does not occur. Conversely, if a phosphor having a low quenching temperature is employed, high power laser beams may overheat the phosphor to the extent that the darkened image is smeared out or enlarged due to inadequate dissipation of heat in the area of beam interaction with the phosphor, thereby minimizing optical resolution. Although some improvement in image resolution is facilitated by employment of a metallic substrate serving as a heat sink for the phosphor, there is a concomitant reduction in sensitivity. Moreover, the screen is still limited to use with a relatively narrow range of laser beam powers. Heretofore, versatility in displaying infrared laser beams with good optical resolution over a wide range of power densities has been only obtained with screens of the foregoing type by using many screens made of phosphors of different thermographic sensitivities, or quenching temperatures, in conjunction with substrates of varying conductive properties.

SUMMARY OF THE INVENTION

The present invention relates to a thermographic phosphor visual displayer for infrared laser beams, and is more particularly directed to a thermographic phosphor display screen whose sensitivity may be varied to display infrared laser beams with maximum optical resolution over a wide range of incident beam power densities.

An infrared laser beam displayer in accordance with the present invention basically includes a viewing screen provided as a thermally conductive substrate coated with phosphor irradiated with ultraviolet light to produce fluorescence. Means are provided to vary the thermal bias on the screen to temperatures less than the fluorescence quenching temperature of the phosphor whereby the bias temperature may be varied commensurate with the temperature produced due to localized heating of the phosphor by an incident laser beam such that the sum of these temperatures is substantially equal to the quenching temperature and a dark beam pattern appears on the screen. As a result, the thermal bias may be varied to provide maximum sensitivity and optical resolution over a wide range of power densities of infrared laser beams to be displayed, and a single screen thereby serves to accommodate a broad range of beam powers.

BRIEF DESCRIPTION OF THE DRAWING

The invention is illustrated in the accompanying drawing wherein the single FIGURE is a semi-schematic cross-sectional view of an infrared laser beam displayer in accordance with the present invention.

DETAILED DESCRIPTION OF THE INVENTION

Referring now to the drawing, there is shown a displayer 11, in accordance with the present invention, for visually displaying the image of the normally invisible beam 12 emanating from an infrared laser 13 in order to facilitate alignment and adjustment thereof. The displayer includes a thermographic display screen 14 comprised of a thermally conductive substrate 16, preferably a metallic backing plate, coated with a phosphor 17. The screen is rendered normally fluorescent by continuous excitation of the phosphor with ultraviolet light, and this may be accomplished by means of commercial ultraviolet fluorescent lamps 18 disposed adjacent to the phosphor coated surface of the screen to flood same with ultraviolet light, as indicated by the rays 19.

Visual display of the infrared laser beam 12 is facilitated by directing the beam upon the fluorescent phosphor surface 17 of screen 14. When the power density of the incident beam is sufficient to locally heat the phosphor to its particular quenching temperature, fluorescence is quenched in the localized area of beam impingement to produce a darkened image pattern of the beam on a fluorescent background. Heretofore, if the beam power density was to low to effect heating to the quenching temperature of the particular phosphor employed, quenching did not occur and no image pattern was produced. On the other hand, high power densities which heated the phosphor to temperatures greatly in excess of the particular quenching temperature caused smearing of the image pattern with an attendant loss in optical resolution. Consequently, in order to provide for the display of infrared laser beams over a wide range of power densities with good sensitivity and resolution, it has been the usual practice to employ a number of display screens made of phosphors of different quenching temperatures in conjunction with substrates of varying conductive properties.

In accordance with the particularly salient aspects of the present invention, provision is made with the displayer 11 to variably thermally bias the display screen 14 to different temperatures less than the quenching temperature of the phosphor 17, whereby the single screen may be employed to display infrared laser beams over a wide range of beam power densities with maximum sensitivity and resolution. In this regard, the screen 14 is mounted in a temperature controlled oven 21 of firebrick, or the like, with the phosphor surface 17 facing outwardly. Heating of the screen is preferably facilitated by means of a resistive heating element 22 disposed within the oven and secured to the interiorly facing surface of the substrate 16 with a sheet 23 of thermally conductive electrical insulating material, such as mica, interposed therebetween. The temperature of the screen is continuously sensed by means of a thermocouple, or equivalent thermoelement 24 mounted in contact with the substrate 16. The heating element and thermoelement are electrically connected to a variable temperature controller 26 which serves to control the heating element in accordance with the temperature sensed by the thermoelement to maintain a screen temperature determined by a variable temperature setting of the controller. Thus, by manipulating the temperature setting of the controller, the screen may be thermally biased to substantially any desired temperature.

With the displayer 11 provided in the manner hereinbefore described, it will be appreciated that the entire screen 14 is heated to a bias temperature $T_o$ determined by the setting of controller 26, which bias temperature $T_o$ is less than the quenching temperature $T_q$ of the phosphor 17. The incident laser beam 12 heats the phosphor in the localized area of beam impingement to further increase the temperature therein by an amount $T_b$ which is dependent upon the beam power density. Thus, the temperature in the localized area of beam impingement is $T_o + T_b$. A darkened image pattern of the beam is then produced when the bias temperature $T_o$ is adjusted such that $T_o + T_b = T_q$. By adjusting bias temperature $T_o$ in an inverse relation to the beam heating temperature $T_b$, this equality can be always maintained. For example, in the case of a relatively high power laser, bias temperature $T_o$ is adjusted to be relatively low since most of screen temperature is contributed by the beam heating temperature $T_b$. Conversely, in the case of a relatively low power laser for which the temperature $T_b$ is small, the bias temperature $T_o$ is set to a relatively high value in order that the overall temperature is equal to the quenching temperature $T_q$. It will be therefore appreciated that by varying the the bias temperature $T_o$, the single displayer 11 may be utilized to display infrared laser beams over a wide range of beam power densities. Moreover, since for a given laser power maximum image resolution will be obtained at a particular phosphor temperature, image resolution can be maximized for any beam power of interest simply by changing the bias temperature $T_o$.

Considering now in detail preferred structure of the screen 14, the phosphor 17 is of a type that has a tendency to create non-radiative transitions with heat. Phosphor compounds of the class falling into Group II through VI of the periodic table of elements which exhibit luminescence, termed direct-band II-VI compound phosphors tend to act in this manner and are consequently well suited to the ends of the present invention. It is to be noted that no quencher is required in the material employed as the phosphor 17 since the heat of the oven 21 establishing the bias temperature $T_o$ depopulates any carrier traps in the phosphor and thereby kills any phosphorescence so that it does not interfere with the required darkening. A preferred material for phosphor 17 which exhibits the foregoing properties is a simple, commercial, cathode-ray-tube phosphor P-2 (ZnS: Cu), although in principle any thermally quenched phosphor can be used. The advantage of using a simple, unquenched phosphor is that it can operate satisfactorily for high as well as low beam powers.

The phosphor 17 is preferably settled, rather than attached by the use of varnish, onto the substrate 16 with a small amount of potassium silicate or equivalent inorganic material, being used as a binder. The settling technique facilitates improved optical resolution of beam images displayed by the screen, and the lack of organic additives in the phosphor screen prevents thermal damage. The substrate 16 is preferably a sandblasted aluminum plate which not only supports the phosphor but enhances its oven temperature uniformity.

As an example of the operation of the displayer 11, a screen 14 of 1 mil thick settled P-2 phosphor on an aluminum plate substrate was subjected to the beam of a carbon dioxide laser (10.6 microns wavelength). For a beam power density of approximately 1.0 w/cm$^2$, maximum optical-resolution images were observed for a substrate bias temperature $T_o$ of 250 °C. A power density of approximately 20 w/cm$^2$ produced maximum optical resolution with a bias temperature of 175°C and thus for higher beam-power densities the phosphor screen would require lower temperature. Thus, there is provided by the present invention a relatively simple visual displayer for infrared that has an effective sensitivity and range control, namely the bias temperature $T_o$ of the phosphor substrate 16, which can be varied to produce maximum optical resolution and sensitivity over a wide range of impinging beam powers.

Although the invention has been hereinbefore described and illustrated in the accompanying drawing with reference to what may be considered a preferred embodiment, various changes and modifications may be made therein without departing from the true spirit and scope of the invention, and thus it is not intended to limit the invention except by the terms of the appended claims.

What we claim is:

1. An infrared laser beam displayer comprising a thermally conductive viewing screen having a phosphor surface for impingement by an infrared laser beam, means irradiating said phosphor surface with ultraviolet light to produce fluorescence thereof, said phosphor having a predetermined fluorescence quenching temperature, and means for variably thermally biasing said screen to temperatures less than said quenching temperature, whereby the bias temperature may be varied such that the sum of the bias temperature and the temperature produced due to localized heating of the phosphor by the impinging beam is substantially equal to said quenching temperature and a darkened beam image pattern appears on the screen.

2. An infrared laser beam displayer according to claim 1, further defined by said phosphor being an unquenched compound phosphor of the class falling into Group II-VI of the periodic table of elements.

3. An infrared laser beam displayer according to claim 1, further defined by said screen comprising a substrate of a material possessing proper thermal properties and having a phosphor layer settled thereon and secured thereto by means of an inorganic binder to define said phosphor surface.

4. An infrared laser beam displayer according to claim 1, further defined by the variable thermal biasing means comprising a temperature controlled oven, said screen mounted in said oven with said phosphor surface facing outwardly.

5. An infrared laser beam displayer according to claim 2, wherein said phosphor is cathode-ray-tube type P-2 (ZnS: Cu) phosphor.

6. An infrared laser beam displayer according to claim 2, further defined by the variable thermal biasing means comprising a temperature controlled oven, said screen mounted in said oven with said phosphor surface facing outwardly.

7. An infrared laser beam displayer according to claim 3, further defined by said substrate being a sandblasted aluminum plate and said phosphor layer being cathode-ray-tube type (ZnS: Cu) P-2 phosphor.

8. An infrared laser beam displayer according to claim 7, further defined by the variable thermal biasing means comprising a temperature controlled oven, said screen mounted in said oven with said phosphor layer facing outwardly and said plate facing inwardly.

9. An infrared laser beam displayer according to claim 8, further defined by said oven including a resistive heating element secured to the inwardly facing surface of said plate with a thermally conductive electrical insulating sheet interposed therebetween, a thermoelement mounted in contact with said plate to sense the temperature thereof, and a variable temperature controller for controlling said heating element in accordance with temperature sensed by said thermoelement to maintain a plate temperature determined by a variable temperature setting of the controller.

* * * * *